Sept. 2, 1947.　　A. HASBROUCK ET AL　　2,426,875
RADIAL AIRCRAFT ENGINE
Filed Sept. 1, 1944　　2 Sheets-Sheet 1
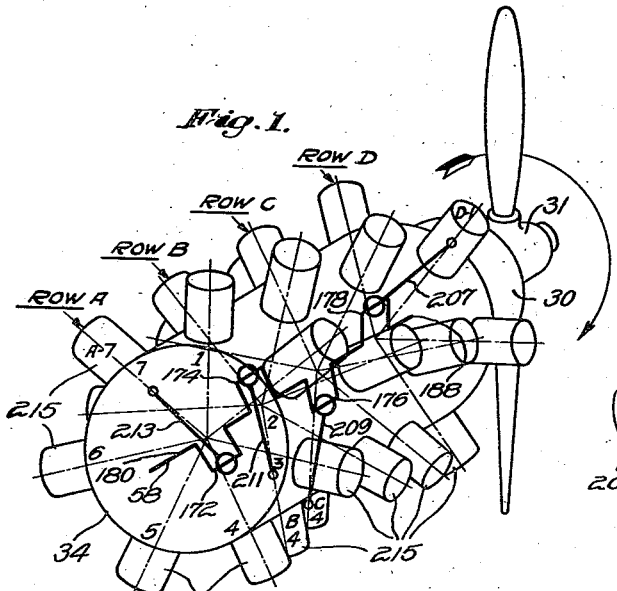
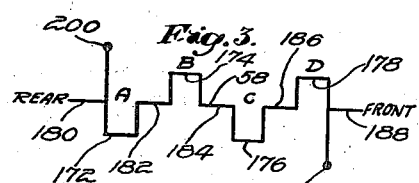
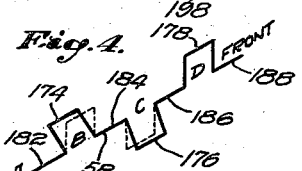
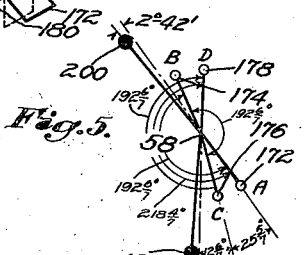
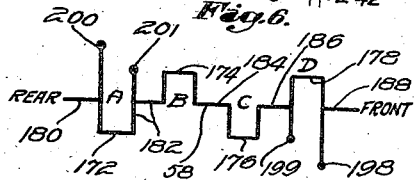
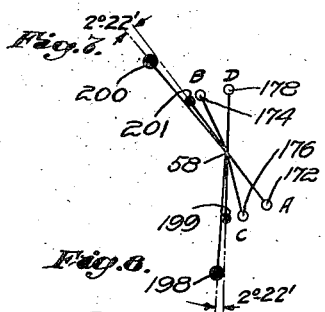
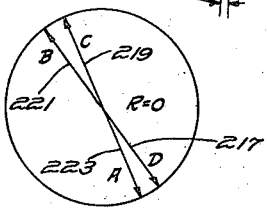
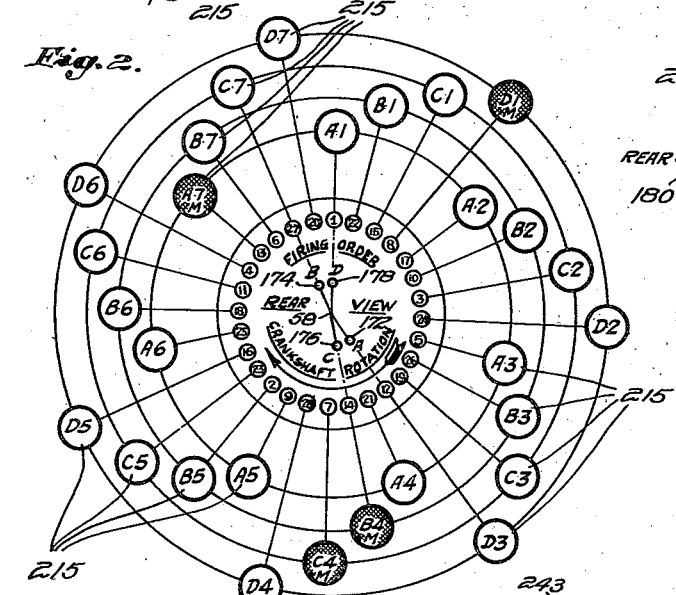
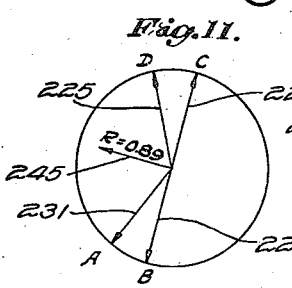
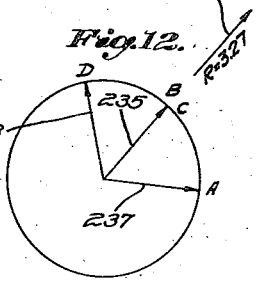
*Inventors*
*Augustus Hasbrouck*
*Alexander H. King*
*Lewis Morgan Porter*
*George L. Williams*
*by Charles L. Shelton*
*Attorney*

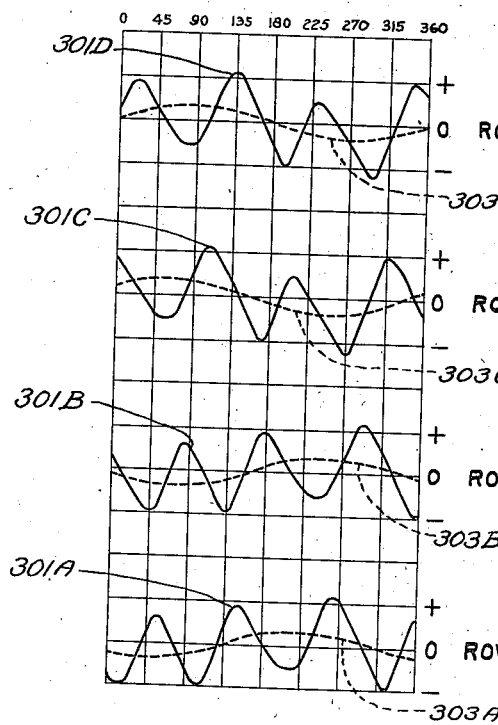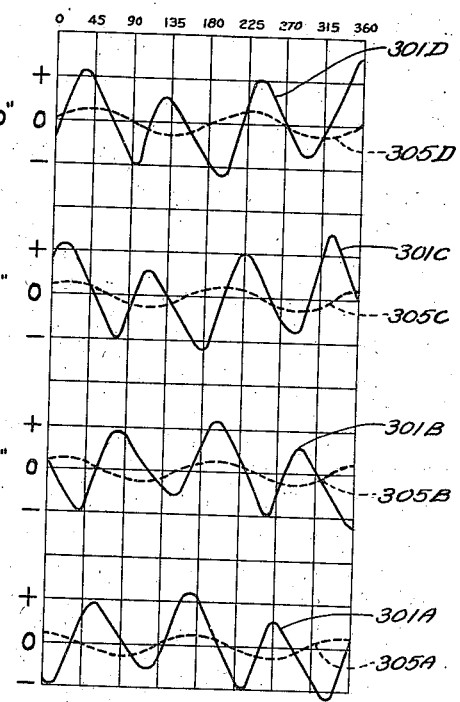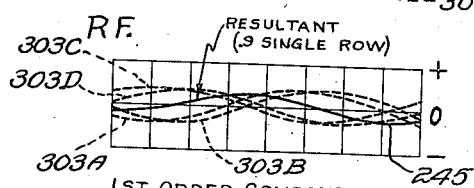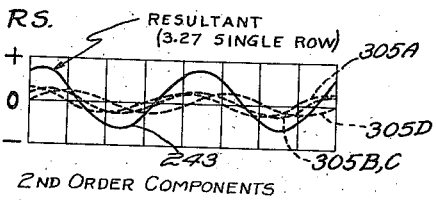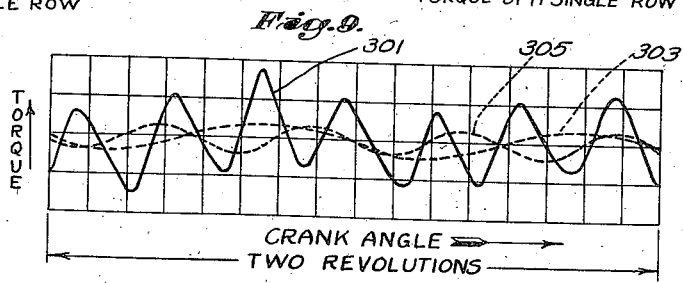

Patented Sept. 2, 1947

2,426,875

UNITED STATES PATENT OFFICE 2,426,875

RADIAL AIRCRAFT ENGINE

Augustus Hasbrouck, Middletown, Alexander H. King, West Hartford, and Lewis Morgan Porter and George L. Williams, Manchester, Conn., assignors to United Aircraft Corporation, East Hartford, Conn., a corporation of Delaware Application September 1, 1944, Serial No. 552,368

7 Claims. (Cl. 121—120)

This invention relates to multi-row radial aircraft engines.

An object of this invention is to eliminate or materially reduce the more troublesome vibrational forces created during operation of a four row radial engine having a master rod and articulated link rod assembly connecting the pistons of each cylinder row with a corresponding crankpin.

Other objects and advantages will be apparent from the specification and claims, and from the accompanying drawings which illustrate what is now considered to be a preferred embodiment of the invention.

In the drawings,

Fig. 1 is an isometric schematic view showing the invention as applied to a four row engine having seven spiral banks of cylinders.

Fig. 2 is a diagram showing the relationship of the crankpin spacing to the cylinder spacing, and the cylinder firing order.

Figs. 3 and 5 are schematic side and end views of the engine crankshaft.

Fig. 4 is a schematic isometric view of the crankshaft, including the hydraulic damper and with the counterweights omitted.

Figs. 6 and 7 are schematic side and end views showing a modification of the crankshaft counterweighting.

Fig. 8 is a force diagram showing the relative positions and magnitudes of certain shaking forces produced in the various cylinder rows during operation of the engine of Figs. 1 and 2.

Fig. 9 is a torque curve showing variations in the turning force applied to the crankpin of any one of the cylinder rows during two crankshaft revolutions of the engine of Figs. 1 and 2, and including in dotted lines certain harmonics of said torque curve.

Fig. 10 is a graph showing at F the phase relationship among the first order harmonics of the torque forces in each of the cylinder rows of the engine of Figs. 1 and 2; at S the relationship among second order harmonics of each row; and at RF and RS the resultants of the first and second order harmonics for the engine as a whole.

Figs. 11 and 12 are phase diagrams showing respectively the phase relationship among the first order harmonics and the second order harmonics illustrated in curve form in Fig. 10.

This invention is an improvement on the invention disclosed in Williams Patent No. 2,195,550, assigned to applicants' assignee. The instant invention relates particularly to four row radial engines and contemplates the elimination or reduction of both shaking and torsional vibration producing engine forces by relating in a novel manner the vibrational forces produced in any one cylinder row to the vibrational forces produced in the other rows so as to produce minimum resultant shaking forces and minimum resultant torsional forces for the engine as a whole, with a minimum amount of counterweighting. By a novel combination and arrangement of master rods, crankshaft, and torsional damper, according to this application, it is possible to build commercially practicable four row radial aircraft engines which are exceptionally smooth running and vibration free and yet are of minimum weight per horse power.

Referring to the drawing, Fig. 1, the crankcase 34 has mounted thereon four circumferential rows A, B, C, D, of cylinders 215 arranged around the axis of the crankshaft 58 in seven longitudinal banks marked 1 to 7. The cylinders of each row are circumferentially offset by equal angles with respect to corresponding cylinders of adjacent rows so that each bank extends spirally with respect to the crankshaft axis, in a right-hand helix. The front cylinder of one bank is offset by the same angle with respect to the rear cylinder of an adjacent bank. Thus the projections of the cylinder axes on a plane normal to the crankshaft axis (Fig. 2) are equally spaced around the crankshaft. Because there are twenty-eight cylinders in all, the angle between any two adjacent cylinder axes is $12\tfrac{6}{7}°$.

Crankshaft 58 is approximately flat as shown in Fig. 3. Adjacent throws AB, BC, CD are disposed on opposite sides of the crankshaft so that crankpins 172, 174, 176, 178 alternate in position, up and down, and are displaced by 180° plus the angle of the cylinder spacing. As shown in Fig. 4 (in which the plane of the front throw D is represented by dotted lines in the other three throws), front intermediate throw C is displaced counterlockwise from front throw D by an angle of 180° plus $12\tfrac{6}{7}°$ or a total of $192\tfrac{6}{7}°$. Similarly, the rear intermediate throw B is displaced counterclockwise from row C by $192\tfrac{6}{7}°$ and the rear throw A is displaced counterclockwise from throw B by $192\tfrac{6}{7}°$. Crankshaft 58 is balanced with a pair of counterweights 198, 200 (Figs. 3 and 5), which may be subdivided if desired to provide four counterweights 198, 199, 200, 201 (Figs. 6 and 7).

This combination of cylinder arrangement and crankthrow arrangement causes two pistons in any one bank to be simultaneously on top dead center while the other two pistons of the same bank are simultaneously on bottom dead center.

For instance, when the crankshaft is in a position in which the piston of row D bank 1 is on top dead center, then the pistons of cylinders C1 and A1 will be on bottom dead center and the piston of cylinder B1 will be on top dead center.

Each crankpin is connected to the pistons in the corresponding cylinder row by an articulated connecting rod assembly comprising a master rod having a big end journalled on the crankpin and link rods pivoted to the big end of the master rod. Such master and link rod systems constitute the best commercially practical method at present known for connecting the pistons of a radial engine to a crankshaft. As they are well-known per se, the link rods have been omitted from Fig. 1 to simplify the drawing. As shown schematically in this figure, and by the letter M in Fig. 2, master rod 207 of D row is connected to the piston in cylinder D1, master rod 209 of C row is connected to the piston in cylinder C4, master rod 211 of row B is connected to the piston of cylinder B4, and master rod 213 of row A is connected to the piston in cylinder A7. With such an arrangement the front and rear master rods are connected to pistons in the front and rear cylinders in adjacent banks, separated by seven cylinder spaces, while the two intermediate master rods are connected to pistons in adjacent cylinders of a bank which is diametrically opposed to the two banks containing the front and rear master rods.

While the articulated connecting rod system is most practical for radial engines, it has the disadvantage that the geometry of the linkage used causes dissimilar piston movements among the pistons of a cylinder row. These different piston movements give rise to unequal and unbalanced inertia forces and gas forces, exerted by the pistons and connecting rod assembly of a cylinder row on the crankshaft to which the connecting rod assembly is connected.

One of the forces so produced is the second order shaking or whirling force, an unbalanced force found to be particularly troublesome in engines of the type described. This force rotates at twice crankshaft speed and is exerted in a direction transverse to the crankshaft axis. The vector representing this force in any one cylinder row rotates about the crankshaft axis at twice crankshaft speed and has a definite angular position at any instant determined by the relative position of the master rod cylinder and of the crankpin for that row. When the master rod piston is on top dead center, or when the master rod is up and the axis of the master rod is in alignment with the axis of the cylinder and lies within the plane of the crankshaft throw, then this second order shaking vector also lies within the plane of the crankshaft throw and the force represented by this vector is exerted downwardly on the crankshaft by the piston and connecting rod assembly. In other words, when the crankshaft throw is up on top dead center for the master rod cylinder, the second order shaking vector is coaxial with the cylinder axis and points away from the piston. As the vector rotates at twice crankshaft speed, it will again be coaxial with the axis of the master rod cylinder and will again point downwardly away from the piston when the crankpin is in a position placing the piston to which the master rod is attached on bottom dead center.

A second order shaking force as described above is produced by each row of pistons and its associated articulated connecting rod assembly, hence there will be such an unbalanced force existing during engine operation in each of the cylinder rows A, B, C, and D of the four row engine illustrated in the drawing.

With the combination and arrangement of crankthrows shown in Figs. 1 to 7, and for the crankshaft position shown in Figs. 1 and 2, the second order shaking vector of row D will be in the position shown at 217 in Fig. 8. Knowing the location of the vector when the master rod piston is at either top dead center or bottom dead center, then it can also be located for any other crankshaft position; and this has been done in Fig. 8 for the crankshaft position shown in Figs. 1 and 2, the vector position relative to the crankshaft axis being represented by the line 217. For this same crankshaft position the second order shaking forces of rows C, B and A will be disposed respectively as shown by the vectors 219, 221, and 223 in Fig. 8, when the master rods and crankthrows are relatively positioned as shown in Figs. 1 to 7.

It will be seen by reference to Fig. 8 that the resultant of all the four shaking forces exerted by the pistons and connecting rod assemblies of rows A, B, C, D on the crankshaft 58 is zero. Each row of pistons and its connecting rod assembly produces a second order shaking force that has a frequency and magnitude found likely to cause structural failure of the engine or associated parts, but the master rods of all the rows are so disposed relative to each other and relative to the position of the crankthrows that the resultant shaking force of all the piston and connecting rod assemblies is zero. Thus, the effect of these shaking forces is eliminated for the engine as a whole, simply by disposing the master rods and crankshaft throws as shown in Figs. 1 to 7, thereby balancing vibration producing forces found to be particularly troublesome in a radial engine of the type described, without increasing the weight of the engine in any respect.

The forces represented by the vectors 217, 219, 221, and 223 in Fig. 8 are spaced along the crankshaft, being applied to the crankshaft at the longitudinal positions of the crankthrows D, C, B, A, respectively. Consequently each pair of forces DB and CA produce a couple tending to rock or pitch the crankshaft. But with the master rod and crankthrow combination shown, the couple produced by vectors 217 and 221 is nearly opposite in direction to the couple produced by vectors 219 and 223; hence these couples oppose each other and approximately balance out. Because the vectors do not all lie exactly in the same plane there is a small resultant couple; this resultant is quite small in magnitude and therefore may be neglected in commercial practice.

The articulated connecting rod system also causes variations in the turning effort or torque applied to the crankshaft. If the torque exerted on the crankshaft by the articulated connecting rod assembly of any one cylinder row is plotted against crankshaft position, during two crankshaft revolutions, the resulting curve has a series of peaks, which are alternately positive and negative with respect to the average or mean torque line indicated in Figs. 9 and 10 as the zero line, as shown by the curve 301 in Fig. 9. These peaks vary in magnitude and the torque curve is non-uniform because of the dissimilar piston movements caused by the geometry of the articulated connecting rod system. This curve (which may be determined experimentally or may be calculated) is periodic, being repeated in each cycle of engine operation, or for each two successive crankshaft revolutions in which all the cylinders of any one row are fired, as shown in Fig. 2. Hence it may be resolved into a number of sine waves, or harmonics, which when added together produce a resultant that has exactly the same frequency and amplitude as the original curve. Two of these harmonics which have frequencies respectively equal to and twice crankshaft R. P. M., are shown at 303 and 305 in Fig. 9. These two first and second order torsional forces have frequencies and magnitudes that render them particularly detrimental in engines of the type described.

As the variation of the torque curve from one having uniform peaks is caused by the geometry of the articulated connecting rod system, the force represented by curve 301 in Fig. 9 will be repeated in each of the cylinder rows A, B, C, D of Figs. 1 and 2. The phase relationship of these curves, and of their first and second order harmonics, is determined by the relative position of the master rods and crankpins, and is shown in Fig. 10 for the combination and arrangement of Figs. 1 to 7.

Fig. 10 shows under the graph headed "1st order" the phase relationships between the first order torsional forces or harmonics of the rows D, C, B, and A, represented respectively by the curves 303D, 303C, 303B, and 303A. These curves are combined in the lower left-hand graph to produce the resultant curve 245, which represents the resultant first order torsional force for the engine as a whole. It will be seen that the phase relationships of these various first order torsional forces are such as to produce a resultant torsional first order force which is substantially less than that produced in any one row.

Referring to Fig. 11, the first order torsional forces produced by the master rod and crankthrow combination of Figs. 1 to 7 are shown in a phase diagram for the respective rows D, C, B and A at 225, 227, 229, 231. It should be noted that this diagram does not show vectors in the sense of forces having directions, but merely shows the phase relationship between the respective first order torsional forces produced in each row. For instance, there will be a torsional force represented at 225 produced in row D which is of the first order, or which rotates at crankshaft speed. If this force at a particular instant is represented at 225 then the corresponding first order torsional forces of rows C, B and A will have phases relative to the force 225 as represented at 227, 229, and 231. The resultant of these four torsional forces is shown at 245 and is 0.89 times the value of the first order torsional force produced in any one row.

The second order torsional force in each row, represented at 305 in Fig. 9, has a frequency and magnitude that is less likely to cause vibrational engine troubles than the second order shaking forces and the first order torsional forces. In addition, the resultant second order torsional force for the engine as a whole is materially less than the sum of the various second order torsional forces of all the rows, with the master rod, crankthrow, and cylinder combination and arrangement illustrated in Figs. 1 to 7. With this combination of parts the second order torsional forces of the rows D, C, B and A will be in the phase relationship at any instant as shown at 305D, 305C, 305B and 305A in Fig. 10. The resultant second order torsional force is shown at 243 in the graph at the lower right of Fig. 10. While this resultant is greater than the force for any one row, it is materially less than the sum of the forces for the four rows.

Referring to the diagram of Fig. 12, the phase of the second order torsional forces is represented for D row by the lines 233, while the phases of the corresponding forces for the C, B and A cylinder rows are represented by the lines 233, 235 and 237. The resultant second order torsional force for the engine as a whole is represented by the line 243.

As stated above the second order torsional forces are not ordinarily as detrimental to engine operation as are the first order torsional forces and the second order shaking forces. But the effect of the second order shaking forces is almost completely eliminated for the engine as a whole with the combination of parts shown as illustrated in Fig. 8, and the resultant first order torsional force 245 for the engine as a whole is substantially less than the force 303 produced in any one row. Hence, the second order resultant torsional force 243 may be the largest or most important force left when the other forces are substantially balanced in the manner described above, because the second order torsionals are only partially balanced.

To further reduce or eliminate the effect of this resultant second order torsional force on the engine and its associated parts, a hydraulic torsional damping unit as shown at 206 in Fig. 4 may be provided. Because the only material unbalanced force remaining in this combination of Figs. 1 to 7 is the resultant of the second order torsionals, this damper may be designed expressly to remove or to damp torsional vibration caused by the resultant second order torsional force, and hence will efficiently and almost wholly eliminate the effect of this force from the engine. Hence by the combination of Figs. 1 to 7, including the damper 206, an engine having exceptionally uniform and smooth running characteristics is provided.

As the damper 206 may be conventional per se it has not been illustrated in detail. Reference is made to the Hobbs-Willgoos application Serial No. 552,368, filed concurrently herewith for a detailed showing of this damper unit and for details of the engine schematically shown in the drawings of this application.

Reference is made to our applications Serial No. 552,369 and Serial No. 552,370, filed concurrently herewith, which claim subject matter disclosed and not claimed in this application.

The word "longitudinal" is used in a broad sense in this application to include cylinder banks extending generally lengthwise.

It is to be understood that the invention is not limited to the specific embodiment herein illustrated and described. For instance, it may be used in engines having five or nine longitudinal banks, or more than four circumferential rows, or in other ways without departure from its spirit as defined by the following claims.

We claim:

1. In a four row radial engine, an articulated connecting rod system for each row including a master rod and link rods which create second order shaking forces during engine operation, said master rods being so angularly disposed relative to one another that the second order shaking forces of the intermediate rows lie approximately in a common plane and point in approximately the same direction and that the second order shaking forces of the front and rear rows also lie approximately in said common plane but point in approximately the opposite direction from said shaking forces in said intermediate rows.

2. An engine according to claim 1, having cylinders and crankthrows so arranged that the top dead center piston position of each master rod cylinder is followed at about one hundred and eighty degrees of crank angle by the top dead center piston position of some other master rod cylinder.

3. In a radial aircraft engine having four circumferential cylinder rows with at least seven cylinders in each row, said cylinders having pistons therein, the cylinder axes of adjacent rows being angularly offset to form at least seven spirally extending banks of cylinders equally angularly spaced with respect to each other, a crankshaft having four alternately reversed crankthrows, one for each of said rows of cylinders, said crankthrows being angularly offset in accordance with the angular displacement of the cylinders in said spiral banks so that when the plane of one of said crankthrows is aligned with the axis of one of said cylinders the planes of the other crankthrows will be respectively aligned with the axes of cylinders in the other rows, and a master rod and link rod assembly connecting the pistons of each of said rows to the corresponding crankthrow, the two intermediate master rods being connected with pistons in adjacent cylinders of one of said cylinder banks and the two end master rods being connected with the pistons in the front and rear cylinders of adjacent cylinder banks which are diametrically opposed to said one cylinder bank.

4. In a radial aircraft engine having four or more rows of cylinders arranged in five or more spirally extending banks, a crankshaft having a separate crankthrow for each of said rows, said crankshaft having adjacent throws which are spaced angularly by 180° plus the angle of offset of corresponding cylinders in adjacent rows of said cylinder banks, an articulated connecting rod assembly including a master rod and link rods connecting each of said cylinder rows with a corresponding crankpin, a first pair of said master rods being located respectively in a pair of cylinders whose axes are angularly spaced relative to each other by approximately 90° and a second pair of said master rods being located respectively in a pair of cylinders whose axes lie approximately on a line bisecting the axes of said first named pair of cylinders.

5. In a radial engine having cylinders arranged in four circumferential rows and seven spirally extending banks each of which contain a cylinder of each row, a crankshaft having adjacent throws in substantially opposed angular positions, master rods, one in each of the intermediate rows, placed in contiguous cylinders of one bank, and master rods, one in each of the front and rear rows, placed in cylinders contained in the two banks most nearly diametrically opposite said bank containing the intermediate master rods, said front and rear master rod cylinders having relative to one another the maximum angular spacing possible within said two banks.

6. A radial engine having four cylinder rows and having articulated connecting rod assemblies respectively associated with each row, said cylinders being arranged in longitudinally extending banks each containing a cylinder of each row, a crankshaft having a crankpin for each of said rod assemblies, said crankpins lying approximately in a common plane, master rods, one in each of the intermediate rows, placed in contiguous cylinders of one of said banks, and master rods, one in each of the front and rear rows, placed in cylinders contained in the two banks most nearly diametrically opposite said bank containing the intermediate master rods, said front and rear master rod cylinders having relative to one another the maximum angular spacing possible within said two banks.

7. A radial engine having four cylinder rows and having articulated connecting rod assemblies respectively associated with each row, said cylinders being arranged in longitudinally extending banks each containing a cylinder of each row, a crankshaft having a crankpin for each of said rod assemblies, said crankpins lying approximately in a common plane, master rods, one in each of the intermediate rows, placed in contiguous cylinders of one of said banks, and master rods, one in each of the front and rear rows, placed in cylinders contained respectively in the two banks most nearly diametrically opposite said bank containing the intermediate master rods.

AUGUSTUS HASBROUCK.
ALEXANDER H. KING.
LEWIS MORGAN PORTER.
GEORGE L. WILLIAMS.

REFERENCES CITED

The following references are of record in the file of this patent:

UNITED STATES PATENTS

| Number | Name | Date |
|---|---|---|
| 2,028,903 | Griswold | Jan. 28, 1936 |
| 2,313,206 | Sarazin | Mar. 9, 1943 |
| 2,195,550 | Williams | Apr. 2, 1940 |
| 2,120,045 | Towns | June 7, 1938 |

FOREIGN PATENTS

| Number | Country | Date |
|---|---|---|
| 50,255 | France | Jan. 29, 1940 |